United States Patent
Luan et al.

(10) Patent No.: US 12,549,647 B2
(45) Date of Patent: Feb. 10, 2026

(54) CROSS-ZONE DATA PROCESSING

(71) Applicant: PayPal, Inc., San Jose, CA (US)

(72) Inventors: Xiaojun Luan, Shanghai (CN); Haoran Zhang, Shanghai (CN); Jiaxin Fang, Shanghai (CN); Jun Li, Wuxi (CN); Kun Wang, Shanghai (CN); Pengshan Zhang, Shanghai (CN); Xia Zhang, Shanghai (CN); Xin Wang, Shanghai (CN); Yangxing Liu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 74 days.

(21) Appl. No.: 18/047,013

(22) Filed: Oct. 17, 2022

(65) Prior Publication Data

US 2024/0106920 A1     Mar. 28, 2024

(30) Foreign Application Priority Data

Sep. 22, 2022  (WO) ................ PCT/CN2022/120664

(51) Int. Cl.
*G06F 15/16* (2006.01)
*H04L 67/133* (2022.01)
(Continued)

(52) U.S. Cl.
CPC ............ *H04L 69/08* (2013.01); *H04L 67/133* (2022.05); *H04L 67/561* (2022.05)

(58) Field of Classification Search
CPC ...... H04L 69/08; H04L 67/133; H04L 67/561
(Continued)

(56) References Cited

U.S. PATENT DOCUMENTS

2014/0372509 A1     12/2014  Fausak et al.
2014/0373098 A1 *   12/2014  Fausak .................. H04L 63/102
                                                          726/4
(Continued)

FOREIGN PATENT DOCUMENTS

CN          104158891 A       11/2014
CN          112311893 A        2/2021
(Continued)

OTHER PUBLICATIONS

International Search Report and Written Opinion in PCT Appl. No. PCT/CN2022/120664 mailed May 18, 2023, 7 pages.

*Primary Examiner* — Vivek Srivastava
*Assistant Examiner* — Karina J Garcia-Ching
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for implementing cross-zone communication for computing zones executing different coding protocols. A server computer system may receive, via a proxy layer of a first instance of an application executing within a first computing zone according to a first set of coding protocols, a request for a service executed via a second instance of the application in a second computing zone according to a second, different set of coding protocols. The system may alter, via a remote layer of the first instance, a set of data specified in the request to comply with the second, set of protocols. The system may transmit, via the remote layer of the first instance to a remote layer of the second instance, the altered set of data. The system may advantageously provide a simplified development interface allowing for both development and testing within a local environment without deployment of multiple different services.

20 Claims, 8 Drawing Sheets

(51) Int. Cl.
*H04L 67/561* (2022.01)
*H04L 69/08* (2022.01)

(58) Field of Classification Search
USPC .......................................................... 709/230
See application file for complete search history.

(56) References Cited

U.S. PATENT DOCUMENTS

| | | | |
|---|---|---|---|
| 2016/0092339 A1* | 3/2016 | Straub | G06F 9/44521 |
| | | | 717/124 |
| 2018/0060341 A1 | 3/2018 | Wu et al. | |
| 2018/0060460 A1 | 3/2018 | Zhang et al. | |
| 2020/0210228 A1 | 7/2020 | Wu et al. | |
| 2020/0257693 A1* | 8/2020 | Pounds | G06F 16/23 |
| 2020/0409931 A1 | 12/2020 | Zang et al. | |
| 2021/0004214 A1* | 1/2021 | Alex | G06F 8/71 |
| 2021/0334312 A1 | 10/2021 | Neo et al. | |
| 2022/0012169 A1 | 1/2022 | Zhang et al. | |

FOREIGN PATENT DOCUMENTS

| | | |
|---|---|---|
| JP | 2019146176 A | 8/2019 |
| WO | 2022000375 | 1/2022 |

\* cited by examiner

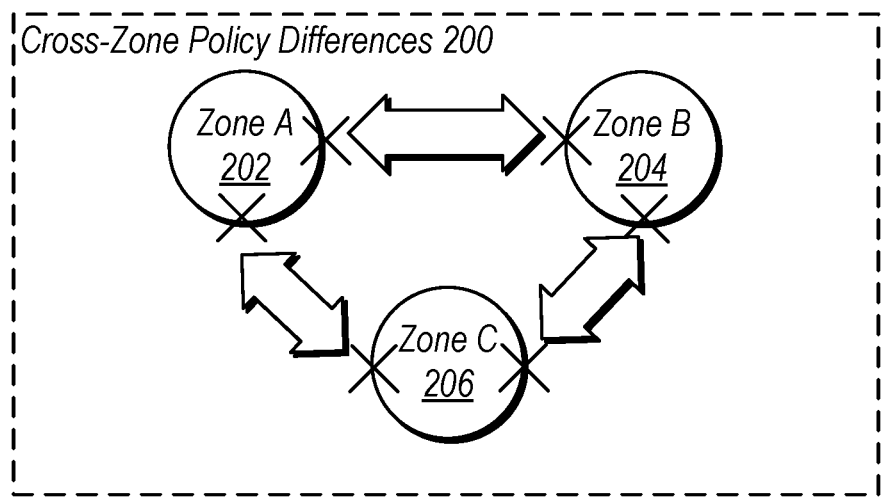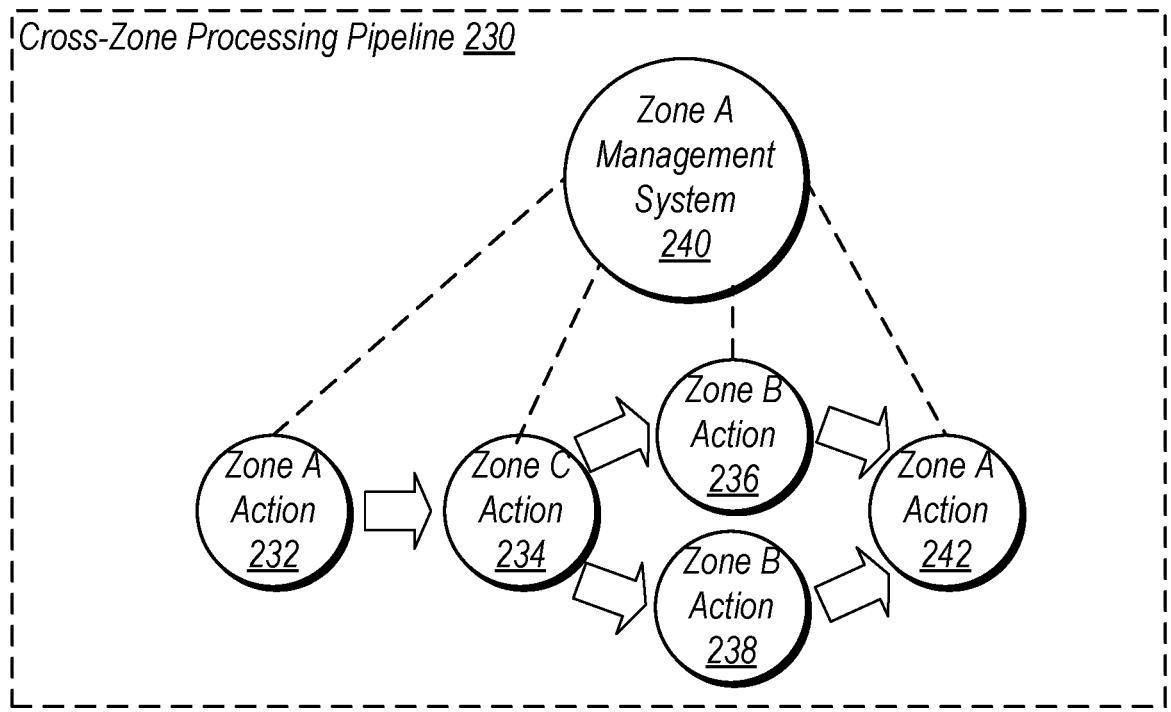
Fig. 2

*Method 700*

Receive, via a proxy layer of a first instance of an application executing within a first computing zone according to a first set of coding protocols, a request for a service executed via a second instance of the application in a second computing zone according to a second, different set of coding protocols.
710

Alter, via a remote layer of the first application instance, a set of data specified in the request to comply with the second, different set of coding protocols.
720

Transmit, via the remote layer of the first application instance to a remote layer of the second application instance, the altered set of data specified in the request for the service.
730

*Fig. 7*

CROSS-ZONE DATA PROCESSING

PRIORITY CLAIM

The present application claims priority to PCT Appl. No. PCT/CN2022/120664, filed Sep. 22, 2022, which is incorporated by reference herein in its entirety.

BACKGROUND

Technical Field

This disclosure relates generally to data management, and, more specifically, to techniques for managing communication of data across multiple computing zones having different data management and communication protocols.

Description of the Related Art

As more and more entities migrate their data from physical data centers to cloud storage, data communication across the cloud storage becomes increasingly complex. Similarly, as individual entities split their data between different zones (e.g., online production zone, offline batch compute zone, etc.) data communication and security policies across these difference zones becomes more complex, which may require greater computer resources such as network bandwidth, storage, CPU processing, monetary resources, etc. For example, the number of policies (e.g., security policies such as authentication policies) that data must follow when being communicated across zones increases. This in turn may increase a burden of development in generating program code within a multi-zoned development environment.

BRIEF DESCRIPTION OF THE DRAWINGS

FIG. 2 is a block diagram illustrating example cross-zone policy differences and an example cross-zone processing pipeline, according to some embodiments.

FIG. 7 is a flow diagram illustrating a method for processing cross-zone data processing requests via a multi-layer application configuration, according to some embodiments.

DETAILED DESCRIPTION

Figure 1:
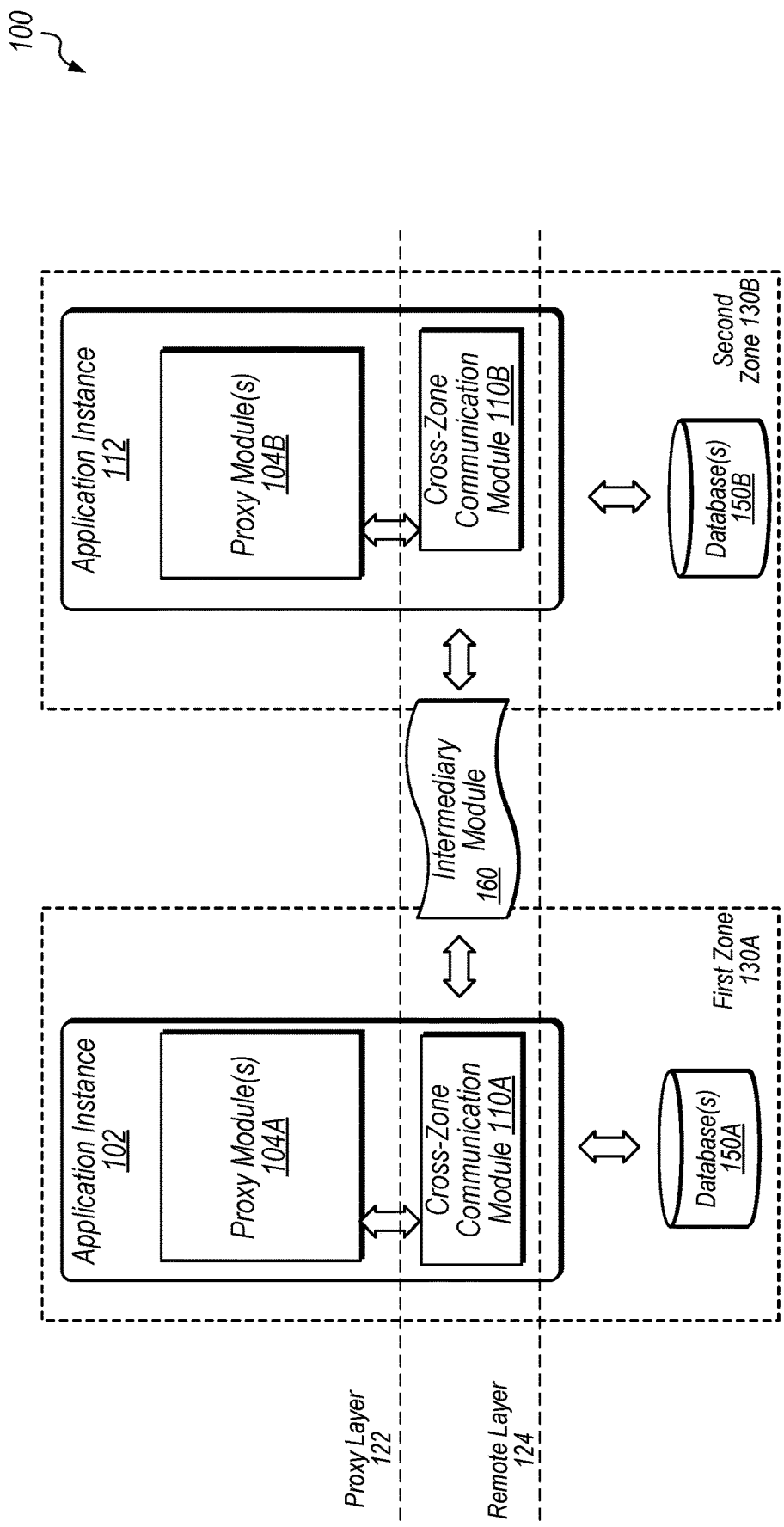
FIG. 1 is a block diagram illustrating an example system configured to facilitate cross-zone data processing, according to some embodiments.

In various situations, cross-zone (which may also be referred to herein as cross-cloud) data processing has become increasingly complex due to different policies being implemented within the different zones or different cloud environments. For example, as part of executing a given programmed process, a computing system may need to execute a first step to process a set of data in a first zone and then execute a second step to process the set of data in a second zone. In this example, the first zone may require communication via hypertext transfer protocol (HTTP) while the second zone may require communication via messageQ. Consequently, in this example, the program code for the given programmed process may need to be altered to allow for communication between the two zones requiring two different communication protocols. Different zones may execute different types of communication, data management, security, etc. policies or protocols. As one specific example, within a given system architecture, two separate engines may execute data management and data loading. In this specific example, a data management engine is deployed as a software as a service (SaaS) (e.g., a customer data platform) within an online production zone, while a set of data loading tasks are executed in a distributed computing cluster (e.g., a Hadoop cluster) within an offline batch compute processing zone. In other situations, the online production zone may be executed within a cloud computing environment (e.g., Google Cloud Platform™).

Traditional cross-zone communication systems often attempt to address differences in cross-zone policies by manually altering each portion of program code involved in cross-zone data processing. Another traditional method involves developing highly customized services and agents and deploying these services across zones or across different clouds. However, such solutions are expensive to develop and maintain (both computationally and financially). For example, one traditional communication system attempts to facilitate cross-zone communication via a cloud gateway, where a plurality of different microservices corresponding to different data zones communicate with the cloud gateway to facilitate communication between each different zone. Such cloud gateway communication, however, is cumbersome in terms of computational resources and is often difficult for end users to interact with and implement.

The disclosed techniques provide a framework that includes one or more layers of abstraction obscuring differences in protocols and security policies across different zones or cloud services, while preventing intrusion on entity-specific logic (e.g., business logic), which may advantageously reduce both development and maintenance costs for program code belonging to different entities communicating cross-zone or cross-cloud. For example, during development of program code, the disclosed techniques provide simplified configurations and interfaces to developers to reduce a developer's effort (e.g., a developer view of the program code is abstracted).

During maintenance of the program code, the disclosed techniques build and deploy the same application with different configurations to different zones or clouds. Still further, the disclosed techniques allow for increasing or decreasing a number of application instances within each zone for scalability. In various situations, the disclosed techniques decouple an entity's business logic and the underlying communication logic of program code into two separate layers: a web application layer and an abstraction and adapter layer. For example, the web application layer may be a proxy layer that provides annotations and interfaces to mark services for execution in different zones, while the abstraction and adapter layer may be a remote procedure call (RPC) layer. In order to reduce the cost of developing and managing program code that includes cross-zone or cross-cloud communication, the disclosed techniques alter the overall framework of a networked system rather than requiring developers to alter their underlying business logic.

Unlike entities attempting to employ numerous microsystems to allow different zones or clouds to communicate with a central gateway to enable cross-zone communication, the disclosed framework decoupling techniques may advantageously reduce the amount of time (e.g., developer time) and computational power to both develop and maintain a cross-zone communication network. The disclosed unified management service allows a developer to view a single service including a single code repository to both develop and test their program code in a local environment without having to deploy e.g., two different services and two different testing processes during a development stage. When introducing new zones within the disclosed multi-layer system architecture, for example, a developer does not need to modify or migrate their specific logic (e.g., business logic), but rather the developer is able to develop a new extension to the framework to make their zone addition.

As used herein, the term "zones" refers to a group of computer systems that implement different protocols and policies. For example, a first computing zone may include a collection of one or more data repositories (e.g., a database) that are controlled by a particular network device and operate according to a set of policies. The first computing zone may enforce a first set of policies while a second computing zone may enforce a second, different set of policies. In disclosed techniques, a zone may refer to a given internal environment, such as a testing zone (e.g., a PayPal offline data loading and batch compute zone) or a production zone (e.g., another PayPal code processing zone). For example, data in a software development environment typically has less stringent security requirements than data in a software production environment. Similarly, data in a particular geographical region may have certain legal requirements that differ from those in other regions (e.g., privacy laws). Data centers, physical facilities that store the data that drives enterprise computing applications, can be considered one type of data zone. For example, a zone may also refer to an environment that is distributed across the cloud (e.g., facilitated via Google Cloud Platform), such as one entity's program code being executed within a first data center and communicating across the cloud with a second entity's program code being executed in a second, different data center. As such, the terms cross-zone and cross-cloud may both be used in disclosed embodiments.

Example Multi-Layer System Architecture

FIG. 1 is a block diagram illustrating an example system configured to facilitate cross-zone data processing. In the illustrated embodiment, a system 100 includes two different computing zones 130A and 130B with application instances 102 and 112, respectively, participating in cross-zone communication via an intermediary module 160.

In the illustrated embodiment, first zone 130A includes one or more databases 150A and application instance 102, which in term includes one or more proxy modules 104A, and a cross-zone communication module 110A, separated into two different layers: a proxy layer 122 and a remote layer 124. Proxy layer 122 provides annotations and interfaces to entities (e.g., end users or developers), which allow the entities to mark services requiring executed in different computing zones. Remote layer 124 provides a layer of abstraction for implementing protocols or security policies across computing zones. In various embodiments, the remote layer 124 is extensible to adapt to different zones (e.g., developers can adapt the remote layer to different policies or protocols). In some embodiments, application instance 102 is a web application (e.g., executed using Java spring boot). In various embodiments, multiple instances of the application (e.g., other than application instance 102 or application instance 112) are deployed within first zone 130A or second zone 130B. In some situations, application instance 102 and application instance 112 may be executed using a Java framework as Spring Boot™ applications. In other situations, only one of instances 102 and 112 is executed as a spring boot application.

First zone 130A also includes one or more databases 150A storing data for application instance 102. For example, database(s) 150A may act as a code repository storing program code drafted by an entity utilizing application instance 102. Database(s) 150A may also store various policies and protocols implemented by first zone 130A. In some embodiments, first zone 130A is an online production zone deployed as a data management engine. The data management engine may be deployed as a standard software-as-a-service (SaaS) such as a flowchart-based programming environment. As discussed above, as one specific example, the SaaS may be deployed using Spring Boot applications.

In the illustrated embodiment, second zone 130B also includes database(s) 150B executing similarly to database(s) 150A, but storing different policies and protocols. Similarly, second zone 130B includes application instance 112, which includes one or more proxy modules 104B and cross-zone communication module 110B. In disclosed techniques, a service executed within module 110A (or module 110B) is replaced with a proxied version of a service from second zone 130B and this proxied service makes a call to the second zone 130B instead of calling a local service within first zone 130A. For example, the proxied service is an object generated by the disclosed system architecture which implements the same user interface as the origin service. As one specific example, an interface named "Job Service" which has a method name "createJob( )" is implemented by an original implementation named "Job ServicImpl" within an application programming interface (e.g., Hadoop API) that is only reachable within the batch computing zone (e.g., first zone 130A). The disclosed system architecture generates an object in the online computing zone (e.g., second zone 130B) and implements the "JobService" interface and proxies the request to the batch computing zone (e.g., first zone 130A).

In various embodiments, proxy module(s) 104A may receive a request for a service executed via application instance 112. For example, the request may be initiated based on program code generated via application instance 112 by an end user (e.g., a developer). This program code may be executed according to a first set of coding protocols, but may need to communicate with or access data stored at the second zone 130B, which executes according to a second, different set of coding protocols. The request is processed by proxy module(s) 104A and sent to cross-zone communication module 110A included in the remote layer 124 of application instance 102. Cross-zone communication module 110A alters data included in the request to comply with the second, different set of coding protocols implemented by second zone 130B before transmitting the request including altered data to intermediary module 160. Intermediary module 160 then transmits the request to the cross-zone communication module 110B of application instance 112. In various embodiments, intermediary module 160 processes authentication, authorization, and transformation processes for data between zones. In some embodiments, intermediary module 160 is an event-streaming platform such as Apache Kafka™, ActiveMQ™, Redis™, etc.

In some embodiments, application instance 112 performs various operations, including accessing database(s) 150B to retrieve data requested in the request received from first zone 130A prior to relaying this information back to first zone 130A via intermediary module 160. For example, data retrieved from database(s) 150B may require alteration at cross-zone communication module 110B in order to comply with the first set of coding protocols implemented by first zone 130A before it can be communicated to first computing zone 130A.

In this disclosure, various "modules" operable to perform designated functions are shown in the figures and described in detail (e.g., cross-zone communication module 110A, intermediary module 160, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized application-specific integrated circuit (ASIC).

Example Cross-Zone Policy Differences

FIG. 2 is a block diagram illustrating example cross-zone policy differences and an example cross-zone processing pipeline. In the illustrated embodiment, the example 200 shown in the top portion of FIG. 2 shows the clash in communication across different zones due to cross-zone policy differences. For example, zone A 202, zone B 204, and zone C 206 are not able to directly communicate with one another without intervening program code translating or altering data being processed or communicated between these three different zones.

The example 230 shown in the bottom portion of FIG. 2 shows seamless communication between three different computing zones facilitated via the disclosed cross-zone communication architecture that splits application instances into two different layers. For example, zone A management system 240 is able to interact directly with various other zones (e.g., zone B 204 and zone C 206). In the illustrated embodiment, zone A management system 240 performs an action 232 within zone A. This action is the first step in a given pipeline of data processing. Zone A management system 240 causes the next step (action 234) of the data processing pipeline to be performed in zone C (e.g., to process data generated in zone A 202). Zone A management system 240 continues the given data processing pipeline by performing two separate actions 236 and 238 in zone B. Zone management system 240 then performs an action 242 back in zone A to complete the pipeline of data processing. In the illustrated embodiment, the cross-zone data processing pipeline 230 causes direct calls to be made between zones A, B, C, and then back to zone A. For example, instead of system 240 having to manually alter zone A to utilize messageQ (the communication protocol used by zone B) in order to communicate with zone B, while the disclosed cross-zone communication architecture allows zones A and B to communicate without the need to manually alter the communication protocols of these two zones. For example, zone A will still be able to implement HTTP, while zone B implements message without the need for changing each code piece from implementing HTTP to implementing messageQ instead.

Example Application Layers

Figure 3:
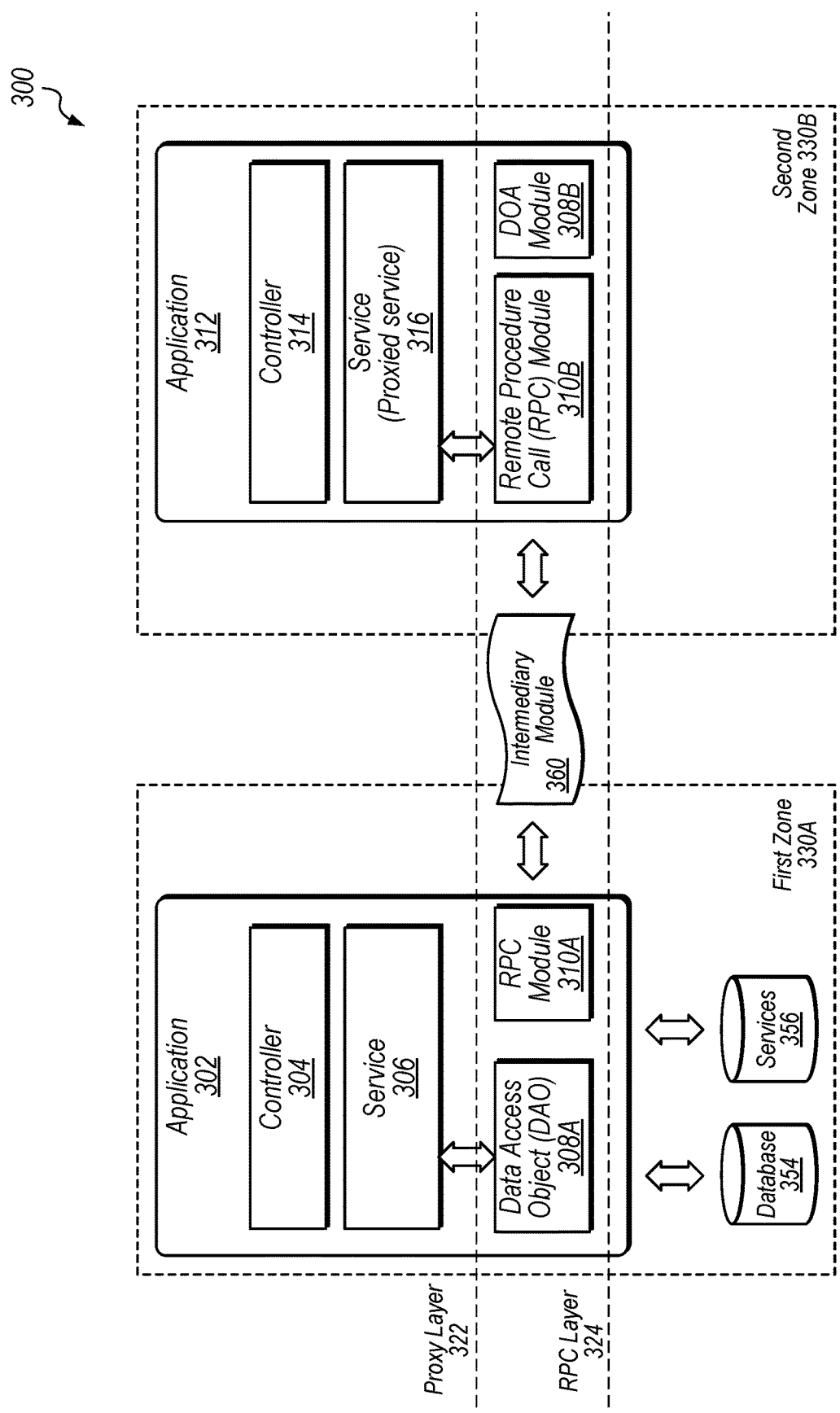
FIG. 3 is a block diagram illustrating example RPC layer policies and example database services, according to some embodiments.

FIG. 3 is a block diagram illustrating example RPC layer policies and example database services. In the illustrated embodiment, system 300 includes a first computing zone 330A and a second computing zone 330B that communicate via intermediary module 360. Intermediary module 360 may be executed via any of various stream processing, database management, or messaging systems. In some embodiments, first zone 330A is a cloud-based computing zone, while second zone 330B is an online production zone. As one specific example, first zone 330A may be executed via Google cloud services, while second zone 330B may be executed via a server computer system that is local to PayPal. In this specific example, zone 330A may require different credentials than zone 330B when communicating data from e.g., the Google cloud service to a PayPal service. In order to maintain the privacy and security of data at the PayPal service, this service implements various security policies that may require various different types of authorizations or authentications.

In the illustrated embodiment, a first computing zone 330A includes a database 354, a plurality of services 356, and an application 302. Application 302 is split into two separate layers: a proxy layer 322 and an RPC layer 324. Proxy layer 322 includes controller 304 and service 306, while RPC layer 324 includes data access object (DAO) 308A and remote procedure call (RPC) module 310A. Database 354 may be implemented as either a relational or a non-relational database. In relational implementations, database 354 may be a MySQL database, for example. In non-relational implementations, database 354 may be implemented as a NoSQL database, for example.

In the illustrated embodiment, second computing zone 330B includes application 312, which is split into the two separate layers. Proxy layer 322 of application 312 includes controller 314 and service 316 (which is a proxied version of service 306), while RPC layer 324 includes RPC module 310B and DOA module 308B. Note that the applications 302 and 312 shown in FIG. 3 may be two different instances of the same application or may be two different applications altogether.

The disclosed system architecture separates applications into two different layers by decoupling a business logic portion of an application from a communication logic portion of the application. For example, proxy layer 322 includes the business logic of application 302 and executes the functions of a typical web application, while the RPC layer 324 includes the communication logic and executes as an adapter layer.

In various embodiments, application 312 receives a request (e.g., from a developer) via controller 314 to execute program code. Controller 314 provides details of the request to service 316 which is a proxied version of service 306. Service 316 performs one or more operations specified in the request and then provides information specifying the one or more operations, or further operations to be performed based on executing the program code, to RPC module 310B. RPC module 310B communicates with DOA module 308B to translate (or otherwise alter) the information prior to transmitting the information to first computing zone 330A via intermediary module 360. In some embodiments, intermediary module 360 performs additional translations or alterations before providing the information for the request to application 302. In various embodiments, the application 302 may receive a request and the process may be repeated in reverse by application 302 in order to communicate or execute program code within second computing zone 330B.

In embodiments in which application 302 receives a request, application 302 may access database 354 or one or more other service 356 to alter data according to the request prior to transmitting information to zone 330B via intermediary module 360.

Example Multi-Repository Cross-Zone Communication

Figure 4:
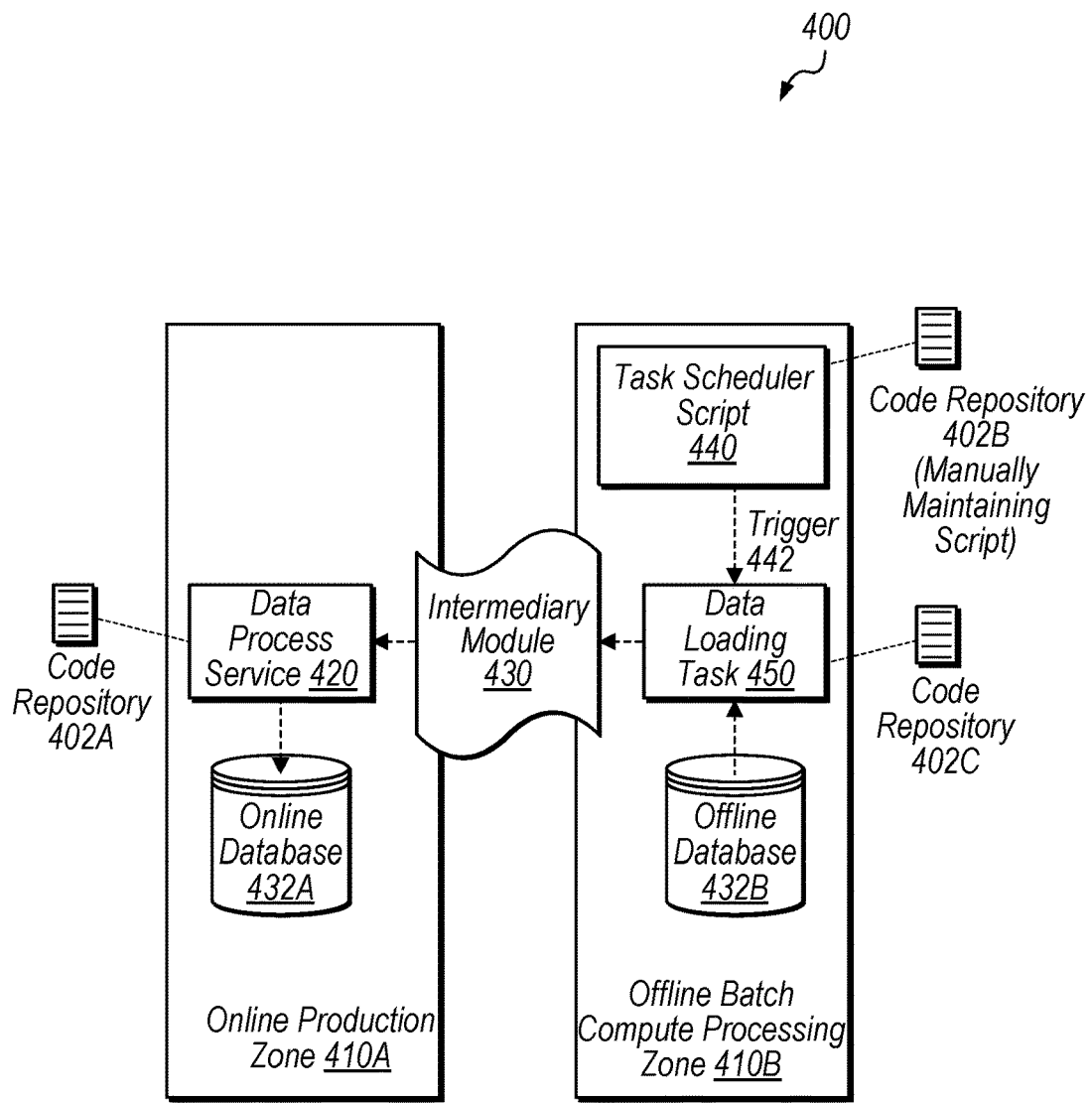
FIG. 4 is a block diagram illustrating example cross-zone communication involving multiple code repositories, according to some embodiments.

FIG. 4 is a block diagram illustrating example cross-zone communication involving multiple code repositories. In the illustrated embodiment, an offline batch compute processing zone 410B communicates with an online production zone 410A to process code maintained in three different code repositories 402A, 402B, and 402C.

In the illustrated embodiment, system architecture 400 requires the maintenance of three different code repositories. Maintenance of three different code repositories that follow different policies according to their respective zones (e.g., zone 410A and 410B), for example, is often expensive both computationally and monetarily due to the time to test, build, and deploy each of these repositories. Offline batch compute processing zone 410B accesses a code repository 402B that manually maintains scripts to obtain task schedule script 440. Script 440 is executed in response to a trigger 442 causing a data loading task 450 retrieved from code repository 402C to be executed. In some situations, data loading task 450 retrieves data from offline database 432B. Data loading task 450, in the illustrated embodiment, sends the retrieved data to intermediary module 430, which alters the retrieved data such that it will comply with policies of online production zone 410A. After altering the retrieved code, intermediary module 430 transmits the data to data process service 420. Data process service 420 accesses code repository 402A to process the data received from intermediary module 430. In some embodiments, as part of processing the received data, data process service 420 accesses online database 432A to store the received data or to retrieve additional data for processing.

Figure 5A:
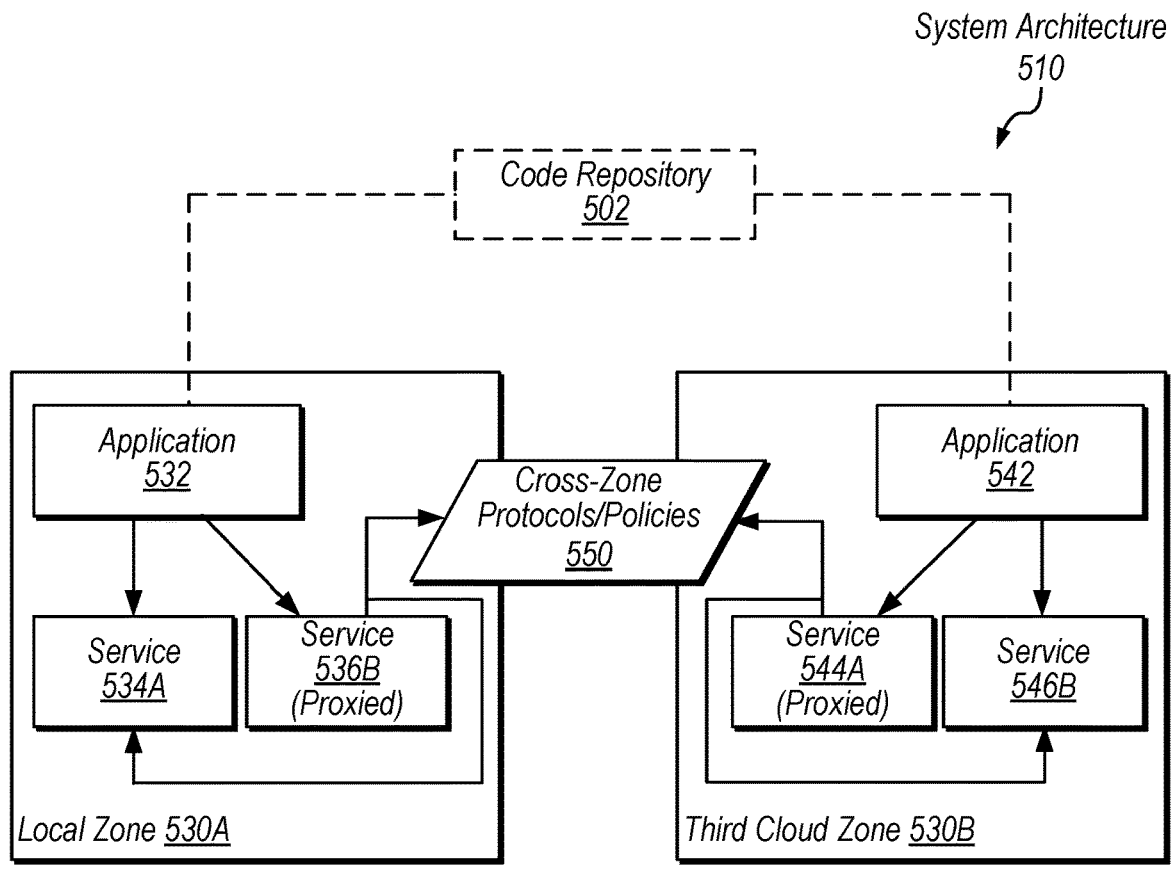
FIGS. 5A and 5B are block diagrams illustrating an example system architecture and a developer view, respectively, of the disclosed cross-zone data processing, according to some embodiments.
Figure 5B:
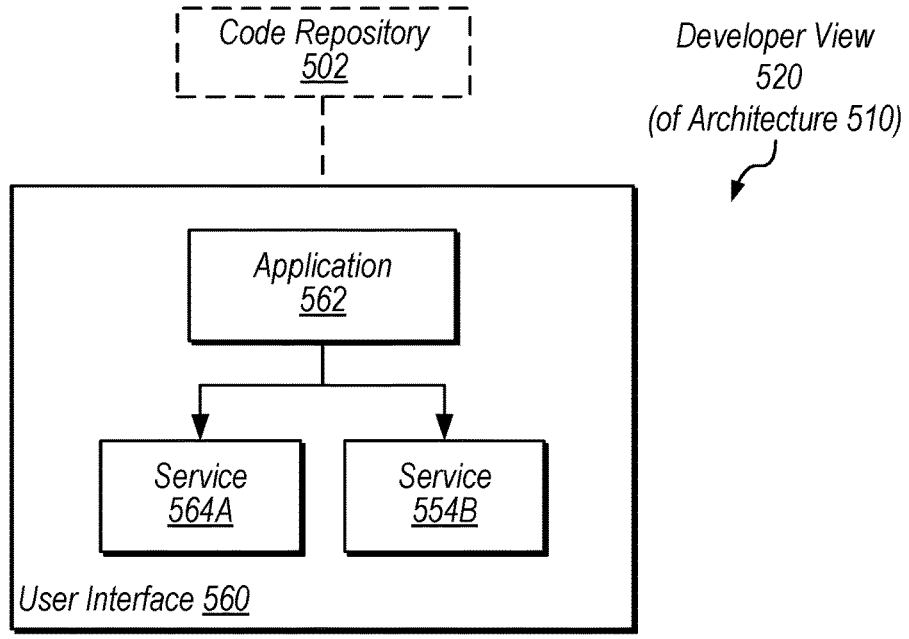

Data analytics and data processing between code repositories 402A, 402B, and 402C may be connected and executed via various different pieces of code generated and communicated via an intermediary module 430, which reduces the flexibility of data processing, particularly if the system is switched from one intermediary platform to another intermediary platform. In this example situation, each code piece executed via the intermediary platform would need to be changed. As shown in FIGS. 5A and 5B, however, the disclosed techniques provide a system architecture that facilitates the maintenance and use of a single code repository across multiple zones.

Example Unified Cross-Zone System Architecture

FIGS. 5A and 5B are block diagrams illustrating example system architecture and a developer view, respectively, of the disclosed cross-zone data processing. In the illustrated embodiment, a system architecture 510 is shown in FIG. 5A and a developer view 520 of the system architecture 510 is shown in FIG. 5B.

In FIG. 5A, system architecture 510 includes a local zone 530A, a third cloud zone 530B, and a code repository 502. The third cloud zone 530B may be one of three different computing zones executed within the cloud that local zone 530A communicates with. System architecture 510 allows zones 530A and 530B to share the same code repository and implementation via the use of different configuration files (a first configuration file is executed for zone 530A while a second, different configuration file is executed for zone 530B).

Local zone 530A includes application 432, while third cloud zone 530B includes application 542. Further, application 532 may include service 534A and service 536B (proxied), while application 542 may include service 544A (proxied) and service 546B. In other situations, service 534A and 536B may be included in another application within local zone 530A other than application 532 (and as such services 534A and 536B are not standalone service). In the illustrated embodiment, the application 532 executed by local zone 530A accesses a single code repository 502 that is shared with the application 542 that executed by third cloud zone 530B. In some embodiments, application 532 executes program code retrieved from code repository 502. For example, application 532 may communicate with service 543A or service 536B (which is a proxied version of service 546B executed within third cloud zone 530B). For example, service 534A may be a graph computation service that takes data from a plurality of different entities (e.g., received via different instances of application 532) and graphs the data such that it can be displayed in a form that is easily understood or manipulated. As one specific example, the graph computation service 534A may graph data for electronic communications (e.g., online transactions) and may perform various computations on the graphed data (e.g., to determine if transactions are suspicious). In some embodiments, both service 534A and service 546B are graph computation services, where one service receives a stream of data from various entities and graphs the data and the other service performs computations on the graphed data. In some embodiments, service 534A may be a data object service for a local database, while service 536B may be a computing service for cloud zone computing.

In FIG. 5B, developer view 520 of architecture 510 includes code repository 502 and user interface 560, which in turn includes application 562, service A 504 and service B 506. One or more developers observing or interacting with view 520 will see only the proxy layer (e.g., proxy layer 322 shown in FIG. 3). For example, end developers will interact with user interface 560 to define certain settings within their respective configuration files in order for the disclosed system architecture 510 to recognize different policies and protocols across different zones. As one specific example, a configuration file may specify one or more of the following: whether a given framework is enabled (e.g., whether remote service execution is enabled), the timeout (e.g., in seconds) for the remote service, one or more protocols for a given zone (e.g., HTTP), a current deployment zone for a given service (e.g., service 534A is deployed within local zone 530A). As one specific example, a given application may be deployed within the same code repository across multiple different computing zones. In this example, different instances of the same application will have different configurations (dictated by configuration files provided within the different zones) across different zones. In this example, however, a developer only sees a single service and code repository while interacting with one of application 532 or 542. Further in this example, the developer is able to develop and test their program code within a single code repository within their local environment without having to deploy multiple different services e.g., during a development stage.

System architecture 510 (along with user interface 560) allows a developer to test and execute their program code across local zone 530A and third cloud zone 530B without having to access or store portions of their code in two different code repositories or without having to interact with or deploy their code across multiple different services in different zones. Instead, a developer sees a single interface with two services in which they can write and test their code via a single code repository 502 in their local environment (local zone 530A). In this way, program code may make a call for a cross-zone service just as easily as making a call to a local service. For example, service 534A is able to make a local call to proxied service 536B even though the original service 546B is located in third cloud zone 530B.

Figure 6:
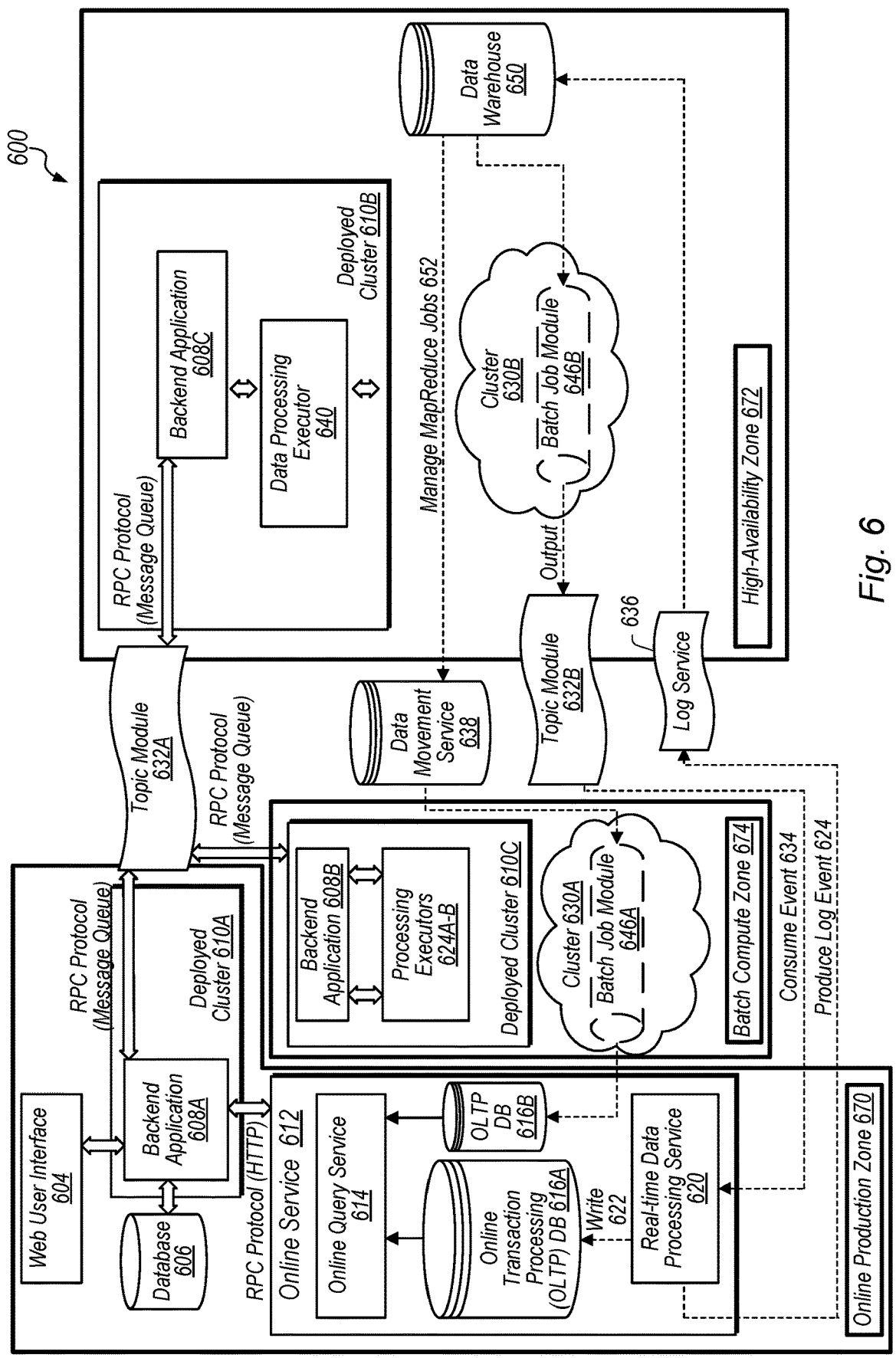
FIG. 6 is a block diagram illustrating example system architecture for a system configured to facilitate cross-zone data processing, according to some embodiments.

FIG. 6 is a block diagram illustrating example system architecture for a system configured to facilitate cross-zone data processing. In the illustrated embodiment, system 600 includes two different zones: online production zone 670, high-availability zone 672, and batch compute zone 674. An example cross-zone data processing infrastructure of a platform (e.g., PayPal) is shown in FIG. 6 to include various different software components (which may be executed via hardware components, e.g., data warehouse 650 may be executed via any of various types of databases) including message queues, databases, clusters, applications, a user interface, etc.

In the illustrated embodiment, several different clusters are deployed across two different computing zones (online production zone 670 and high-availability zone 672) via the same code repository. For example, cluster 610A is deployed within online production zone 670. Similarly, cluster 610B is deployed within high-availability zone 672 and cluster 610C is deployed within batch compute zone 674. In the illustrated embodiment, these deployed clusters 610A, 610B, and 610C execute several backend applications 608A, 608B, and 608C, respectively. As one specific example, these backend applications 608A-608C may be a unified graph management service application that allows various entities to interact with and process data via online graph management services (one example of online service 612). In various embodiments, a developer viewing the code repository used to deploy clusters 610A-610C will see only a single data processing application (e.g., backend application 608A) instead of three separate applications (e.g., applications 608A, 608B, and 608C) due to the single code repository. In this way, the developer is able to deploy a single service when testing or developing their program code within the single code repository.

In various embodiments, an entity (such as a developer) may interact with web user interface 604 to access backend application 608A to deploy their code. Backend application 608A may access database 606 (which may be a relational database such as MySQL™, PostgreSQL™ Azure Database™, etc.), as well as communicate with online service 612 via an HTTP RPC protocol or with components within high-availability zone 672 (i.e., backend application 608C) via a message queue RPC protocol. As one example, message queuing may be executed via one or more of the following message queuing systems: Apache Kafka, Google Pub/Sub™, RocketMQ™. This communication is accomplished through an intermediate topic module 632A (e.g., a first topic implemented within Kafka). Topics may include various categories of messages being communicated via module 632A. For example, a topic may be an independent queued message. As one specific example, a Kafka cluster may include multiple message queues which are independent from one another and are executed for different use cases. In this specific example, one message queue (topic A) might be used for a first topic for RPC communication, while another message queue (topic B) might be used for business data transferring.

Deployed cluster 610C, in the illustrated embodiment, includes processing executors 624A and 624B and backend application 608B. Backend application 608B communicates with one or both of the executors based on commands or data received from topic module 632 via a message queue RPC protocol. Processing executor 624A may be a pipeline executor that executes a pipeline of jobs received from topic module 632, while processing executor 624B may be a validation executor that validates jobs executed by executor 624A. In some embodiments, deployed cluster 610C is a continuous integration (CI) cluster.

The online service 612 shown in the illustrated embodiment may be an online graphing service configured to process and graph various different data, for example. Note, however, that online service 612 may be any of various types of online services that process data, including data requiring processing or communication across different computing zones. Online service 612, in the illustrated embodiment, includes online query service 614, two different online transaction processing (OLTP) databases 616A and 616B, and a real-time data processing service 620. Note that real-time data processing includes processing of a set of data that completes within a threshold amount of time (e.g., milliseconds, seconds, or minutes) from when processing of the set of data was initiated. In the illustrated embodiment, real-time data processing service 620 consumes an event 634 received from topic module 632B included in cluster 630B based on output from the batch job module 646B based on data received from data warehouse 650. In some embodiments, data warehouse 650 stores large-scale offline data from various entities (e.g., businesses). For example, data warehouse 650 might store user operations logs, user profile information, user portraits, etc.

Batch job module 656B may be implemented using Apache MapReduce™, Spark™, etc., while clusters 630A and 630B may be implemented using YARN Hadoop™, Nomad™, Apache Aurora™, etc. Real-time data processing service 620 then performs a write operation 622 to OLTP database 616A based on event 634 as well as sending a produce log event 624 to log service 636, which in turn communicates with data warehouse 650 within high-availability zone 672. OLTP database 616A provides data to online query service 614 e.g., in order for this service to provide data to entities utilizing web user interface 604, for example. In the illustrated embodiment, online service 612 also receives and stores data within OLTP database 616B. The data stored at database 616B is received via data movement service 638. In the illustrated embodiment, data movement service 638 receives and executes data processing jobs 652 from data warehouse 650. Data movement service 638 may be implemented using Wormhole™, Internxt™, etc.

In the illustrated embodiment, deployed cluster 610B includes data processing executor 640. In some embodiments, deployed cluster 610B includes a plurality of executors. For example, deployed cluster 610B may include a pipeline, validation, distributed copy executors, or any of various other types of modules that may execute various batch jobs for backend application 608C. The plurality of executors included in cluster 610B may execute various data processing tasks such as executing Hadoop jobs, for example.

Example Method

FIG. 7 is a flow diagram illustrating a method 700 for processing cross-zone data processing requests via a multi-layer application configuration, according to some embodiments. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 700 is performed by one or more server systems executing within the first zone 130A or the second zone 130B of system architecture 100.

At 710, in the illustrated embodiment, a server computer system receives, via a proxy layer of a first instance of an application executing within a first computing zone according to a first set of coding protocols, a request for a service executed via a second instance of the application in a second computing zone according to a second, different set of coding protocols. In some embodiments, the first set of coding protocols includes an authentication protocol prompting for developer credentials, where the second, different set of coding protocols includes a load-balancing protocol. In some embodiments, the first and second instances of the application are implemented via a single code repository across the first and second computing zones.

At 720, the server computer system alters, via a remote layer of the first application instance, a set of data specified in the request to comply with the second, different set of coding protocols. In some embodiments, the proxy layer of the first application instance is visible to one or more developers utilizing the first application instance and provides annotations and user interfaces to one or more developers interacting with the first application instance, where the remote layer of the first application instance is not visible to the one or more developers and abstracts underlying differences between protocols of different computing zones. In some embodiments, the remote layers of the first and second application instances are remote procedure call (RPC) layers, where the annotations and user interfaces provided by the proxy layer allow developers to indicate one or more services that are executed in different computing zones.

At 730, the server computer system transmits via the remote layer of the first application instance to a remote layer of the second application instance, the altered set of data specified in the request for the service. In some embodiments, the receiving, altering, and transmitting are performed using a single code repository, where the single code repository is usable to develop and execute program code across multiple application instances across multiple different computing zones. In some embodiments, the single code repository simplifies calls made by program code to cross-zone services such that they are similar to calls made to local services (e.g., services that are local to a given computing zone).

In some embodiments, prior to transmitting the set of data specified in the request for the service executed via the second application instance, communicating, by the server computer system via the remote layer of the first application instance with a service executed within the first computing zone. In some embodiments, the communicating includes altering, by the remote layer of the first application instance, data received in the request for the service executed via the second application instance. In some embodiments, the remote layer of the first application is an RPC layer that utilizes an structured query language (e.g., MySQL) or services to execute program code prior to communicating with other zones as part of the code execution.

In some embodiments, the altering includes translating a first type of communication protocol implemented by the first computing zone to a second type of communication protocol implemented by the second computing zone. In some embodiments, the first type of communication protocol implemented by the first computing zone is a client-to-server request-response communication protocol and the second type of communication protocol implemented by the second computing zone is an asynchronous process-to-process communication protocol. For example, the two different communication protocols may be HTTP and messageQ. In some embodiments, the first computing zone is a first cloud computing zone and the second computing zone is a second, different cloud computing zone. In some embodiments, the first computing zone is a cloud computing zone and the second computing zone is an offline testing zone.

In some embodiments, the disclosed system architecture decouples business logic and underlying communication log within a given zone. For example, developers utilizing the disclosed system architecture do not need to see what is occurring under the hood when developing code processes data across multiple zones. In some embodiments, the first computing zone is an online production zone and the second computing zone is an offline batch compute processing zone. In some embodiments, the transmitting between the remote layer of the first application instance executing in the first computing zone and the remote layer of the second application instance executing in the second computing zone is performed via an intermediary data stream processor communicating data between the two computing zones in real-time. In some embodiments, the remote layer of the first application implements Apache Kafka.

Example Computing Device

Figure 8:
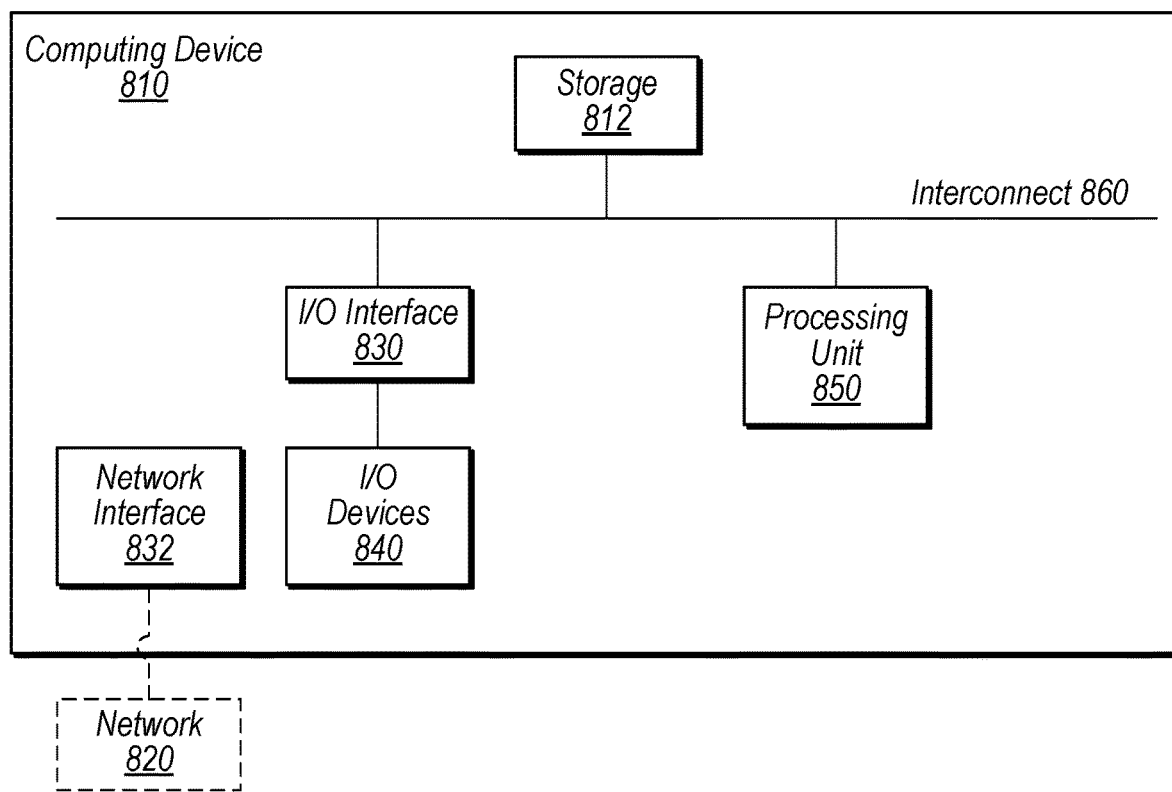
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. In some embodiments, computing device 810 is one example of system 100 or a client computer system executing application instance 102 or a client computer system executing application instance 112. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   receiving, by a server computer system via an abstracted interface implementing a single service including a single code repository, a request to implement different instances of an application across multiple computing zones;
   generating, by the server computer system in response to the request, a cross-zone communication infrastructure by splitting a first instance and a second, different instance of the application executing to communicate across computing zones into two different layers;
   receiving, by the server computer system via a proxy layer of the first instance of the application executing within a first computing zone according to a first set of coding protocols, a request for a service executed via the second, different instance of the application executing within a second computing zone concurrently with the first instance of the application and according to a second, different set of coding protocols, wherein the first and second instances of the application are copies of a single software program that are independently executed using two different configuration files;
   altering, by the server computer system via a remote layer of the first application instance, a set of data specified in the request to comply with the second, different set of coding protocols; and
   transmitting, by the server computer system via the remote layer of the first application instance to a remote layer of the second, different application instance, the altered set of data specified in the request for the service; and
   receiving, by the server computer system via the remote layer of the first application instance, a response to the request for the service, wherein the response includes a second set of data retrieved by the second application instance from a database in the second computing zone and altered by the remote layer of the second application instance to comply with the first set of coding protocols of the first application instance.

2. The method of claim 1, wherein the receiving the request for the service, the altering, and the transmitting are performed using the single code repository, and wherein the single code repository is usable to develop and execute program code across multiple application instances across multiple different computing zones.

3. The method of claim 1, wherein the proxy layer of the first application instance is visible to one or more developers utilizing the first application instance and provides annotations and user interfaces to one or more developers interacting with the first application instance, and wherein the remote layer of the first application instance is not visible to the one or more developers and abstracts underlying differences between protocols of different computing zones.

4. The method of claim 3, wherein the remote layers of the first and second application instances are remote procedure call (RPC) layers, and wherein the annotations and user interfaces provided by the proxy layer allow developers to indicate one or more services that are executed in different computing zones.

5. The method of claim 1, wherein the first computing zone is an online production zone and the second computing zone is an offline batch compute processing zone.

6. The method of claim 1, further comprising:
prior to transmitting the set of data specified in the request for the service executed via the second application instance, communicating, by the server computer system via the remote layer of the first application instance, with a service executed within the first computing zone, wherein the communicating includes:
altering, by the remote layer of the first application instance, data received in the request for the service executed via the second application instance.

7. The method of claim 6, wherein the altering includes translating a first type of communication protocol implemented by the first computing zone to a second type of communication protocol implemented by the second computing zone.

8. The method of claim 7, wherein the first type of communication protocol implemented by the first computing zone is a client-to-server request-response communication protocol and the second type of communication protocol implemented by the second computing zone is an asynchronous process-to-process communication protocol.

9. The method of claim 1, wherein the transmitting between the remote layer of the first application instance executing in the first computing zone and the remote layer of the second application instance executing in the second computing zone is performed via an intermediary data stream processor communicating data between the two computing zones in real-time.

10. A non-transitory computer-readable medium having instructions stored thereon that are executable by a server computer system to perform operations comprising:
receiving, via an abstracted interface implementing a single service including a single code repository, a request to implement different instances of an application across multiple computing zones;
generating, based on the request, a cross-zone communication infrastructure by splitting a first instance and a second, different instance of the application executing to communicate across computing zones into two different layers;
receiving, via a proxy layer of the first instance of the application executing within a first computing zone according to a first set of coding protocols, a request for a service executed via the second, different instance of the application executing within a second computing zone to communicate with the first instance of the application and according to a second, different set of coding protocols, wherein the first and second instances of the application are two instantiations of a single program that are independently executed in different computing zones and are implemented via the single code repository;
altering, by the server computer system via a remote layer of the first application instance, a set of data specified in the request to comply with the second, different set of coding protocols;
transmitting, by the server computer system via the remote layer of the first application instance to a remote layer of the second, different application instance, the altered set of data specified in the request for the service; and
receiving, via the remote layer of the first application instance, a response to the request for the service, wherein the response includes a second set of data retrieved by the second application instance from a database in the second computing zone and altered by the remote layer of the second application instance to comply with the first set of coding protocols of the first application instance.

11. The non-transitory computer-readable medium of claim 10, wherein the receiving the request for the service, the altering, and the transmitting are performed using the single code repository, and wherein the single code repository is usable to develop and execute program code across multiple application instances across multiple different computing zones.

12. The non-transitory computer-readable medium of claim 10, wherein the remote layers of the first and second application instances are remote procedure call (RPC) layers, and wherein annotations and user interfaces provided by the proxy layer allow developers to indicate one or more services that are executed in different computing zones.

13. The non-transitory computer-readable medium of claim 10, wherein the operations further comprise:
prior to transmitting the set of data specified in the request for the service executed via the second application instance, communicating, by the server computer system via the remote layer of the first application instance with a service executed within the first computing zone, wherein the communicating includes:
altering, by the remote layer of the first application instance, data received in the request for the service executed via the second application instance, wherein the altering includes translating a first type of communication protocol implemented by the first computing zone to a second type of communication protocol implemented by the second computing zone.

14. The non-transitory computer-readable medium of claim 10, wherein the first set of coding protocols includes an authentication protocol prompting for developer credentials, and wherein the second, different set of coding protocols includes a load-balancing protocol.

15. The non-transitory computer-readable medium of claim 10, wherein the first computing zone is a first cloud computing zone and the second computing zone is a second, different cloud computing zone.

16. A system, comprising:
at least one processor; and
a memory having instructions stored thereon that are executable by the at least one processor to cause the system to:
receive, via an abstracted interface implementing a single service including a single code repository, a request to implement different instances of an application across multiple computing zones;
generate, based on the request, a cross-zone communication infrastructure by splitting a first instance and a second, different instance of the application executing to communicate across computing zones into two different layers;
receive, via a first layer of the first instance of the application executing within a first computing zone according to a first set of coding protocols, a request for a service executed via the second, different instance of the application executing in a second computing zone concurrently with the first instance of the application and according to a second, different set of coding protocols, wherein the first and second instances of the application are copies of a given software program that are executed in two computing zones using two different configuration files;
alter, via a second layer of the first application instance, a set of data specified in the request to comply with the second, different set of coding protocols;
transmit, via the second layer of the first application instance to a second layer of the second, different application instance, the altered set of data specified in the request for the service; and
receive, via the second layer of the first application instance, a response to the request for the service, wherein the response includes a second set of data retrieved by the second application instance from a database in the second computing zone and altered by the second layer of the second application instance to comply with the first set of coding protocols of the first application instance.

17. The system of claim 16, wherein the first and second instances of the application are implemented via the single code repository across the first and second computing zones.

18. The system of claim 16, wherein the first layer of the first application instance is a proxy layer and is visible to one or more developers utilizing the first application instance and provides annotations and user interfaces to one or more developers interacting with the first application instance, wherein the second layer of the first application instance is a remote layer and is not visible to the one or more developers and abstracts underlying differences between protocols of different computing zones, wherein the second layers of the first and second application instances are remote procedure call (RPC) layers, and wherein the annotations and user interfaces provided by the proxy layer allow developers to indicate one or more services that are executed in different computing zones.

19. The system of claim 16, wherein the instructions are further executable by the at least one processor to cause the system to:
prior to transmitting the set of data specified in the request for the service executed via the second application instance, communicate, via the second layer of the first application instance with a service executed within the first computing zone, wherein the communicating includes:
altering, by the second layer of the first application instance, data received in the request for the service executed via the second application instance, wherein the altering includes translating a first type of communication protocol implemented by the first computing zone to a second type of communication protocol implemented by the second computing zone.

20. The system of claim 16, wherein the first computing zone is a cloud computing zone and the second computing zone is an offline testing zone.

* * * * *